United States Patent [19]

McAnulty, Sr.

[11] Patent Number: 4,673,231
[45] Date of Patent: Jun. 16, 1987

[54] UNDERWATER ELECTRIC CABLE TENSION TERMINATION

[75] Inventor: John A. McAnulty, Sr., Pasadena, Calif.

[73] Assignee: Hughes Aircraft Company, Los Angeles, Calif.

[21] Appl. No.: 825,729

[22] Filed: Feb. 4, 1986

[51] Int. Cl.⁴ .............................................. H01R 11/00
[52] U.S. Cl. ...................................... 439/587; 439/278; 439/580; 439/271; 439/460
[58] Field of Search ................. 339/59 R, 59 M, 60 R, 339/60 C, 60 M, 94 R, 103 R, 117 R, 117 P, 118, 177 R

[56] References Cited

U.S. PATENT DOCUMENTS

| | | |
|---|---|---|
| 3,226,667 | 12/1965 | Senior, Jr. ............................ 339/60 R |
| 3,665,368 | 5/1972 | Ellis ..................................... 339/60 R |
| 3,889,046 | 6/1975 | Oberdiear ........................... 339/103 R |
| 4,156,554 | 5/1979 | Aujla .................................. 339/177 R |
| 4,412,717 | 11/1983 | Monroe .............................. 339/177 R |
| 4,444,453 | 4/1984 | Kirby et al. ........................ 339/177 R |
| 4,479,690 | 10/1984 | Inouye et al. ..................... 339/177 R |
| 4,492,421 | 1/1985 | Ito ....................................... 339/59 R |

Primary Examiner—Gil Weidenfeld
Assistant Examiner—Paula A. Austin
Attorney, Agent, or Firm—H. R. Lambert; A. W. Karambelas

[57] ABSTRACT

Inner and outer helically wound wire tension members (26, 28) are expanded into the cone (38) of cup body (32). Epoxy plug (40) is poured therein. When tension is applied, plug (40) slides within its cup (34) to compressively lock the tension members in the plug. Bosses (42, 44) are formed on the cup and cable sheath (30) and flexible sleeve (50) is sealed to both bosses. This provides sealing during stretching with increased tension.

18 Claims, 2 Drawing Figures

UNDERWATER ELECTRIC CABLE TENSION TERMINATION

BACKGROUND

Some underwater cables are subject to the requirements for disconnectable connections, including electrical connection of a plurality of circuits and tension connection. In the present structure a conical plug surrounds the tension wires and, with increasing tension, slides in a cup to compress the wires. In order to prevent this sliding between the cable and the cup portion of the connector from adversely affecting sealing, a flexible sleeve clamps to both to accomplish a watertight tension termination for the cable. There are a number of applications where an electric cable must be waterproof, must be joinable to similar cables, and must carry tension. One of the applications is in the lowering of equipment into the sea. The equipment being lowered and the weight of the cable cause tension in the cable. When the equipment being lowered requires electric power or has electric signals which should be read, the cable must also include electrical capability isolated from the sea and from other cable components. Manufacturing processes limit the lengths of single cable and practical considerations require that several such cables be connectable and disconnectable so that a cable of the desired length can be assembled. A particularly difficult application of such cables is in the towing of underwater arrays. Exploration and other types of underwater search require the towing of electrically actuated energy and signal source arrays behind moving ships. These arrays must be towed, which causes cable tension, and these cables must be electrically served so as to require a plurality of conductors in the cable. Termination of such cables is difficult to achieve.

SUMMARY

In order to aid in the understanding of this invention, it can be stated in essentially summary form that it is directed to an underwater electric cable tension termination wherein a conical plug embraces the tension members of the cable and the plug is received in a conical cup so that upon increase in cable tension the plug is drawn into the cup to compressively grasp the tension members within the plug. In order to maintain sealing between the cup body and the cable sheath, a flexible sleeve is clamped and sealed to both. Motion of the cable with respect to the cup body stretches the flexible sleeve.

It is, thus, a purpose and advantage of this invention to provide an underwater electromechanical cable tension termination which provides sealed connectability of electric wires and steel strength cables over a range of applied tension to the limits of tension of the cable.

It is a further purpose and advantage to provide a tension termination in an extremely short length to provide passage over and around minimum diameter sheaves and which is completely field installable with a turn-around-time less than six hours.

It is a further purpose and advantage of this invention to employ a cone which embraces the cable tension members with the cone slidable in a cup so that as tension is applied, the cone compresses around the tension members to further grasp them.

It is another purpose and advantage of this invention to provide a cable termination wherein a flexible sleeve covers different portions of the termination which move with respect to each other during changes in tension.

Other purposes and advantages of this invention will become apparent from a study of the following portion of the specification, the claims and the attached drawings.

DESCRIPTION OF THE PREFERRED EMBODIMENT

Figure 1:
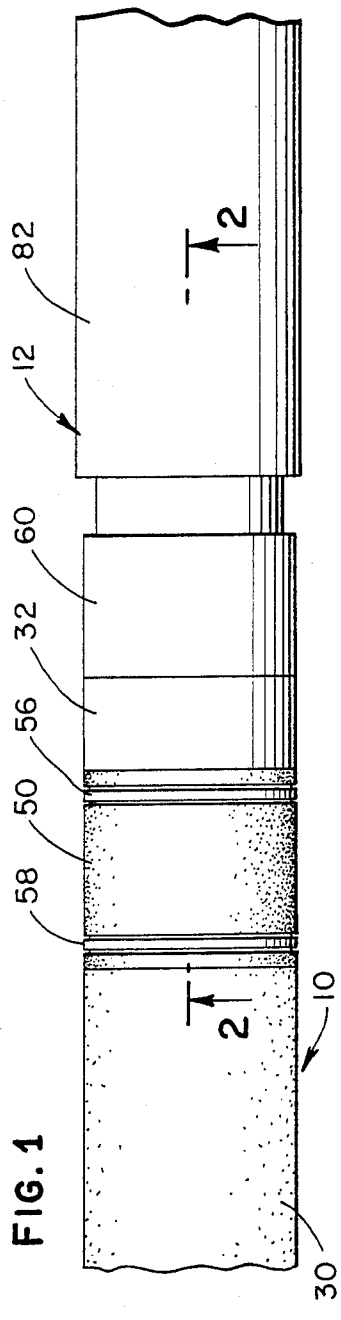
FIG. 1 is a side-elevational view of a portion of an underwater electric cable tension termination, with parts broken away.
Figure 2:
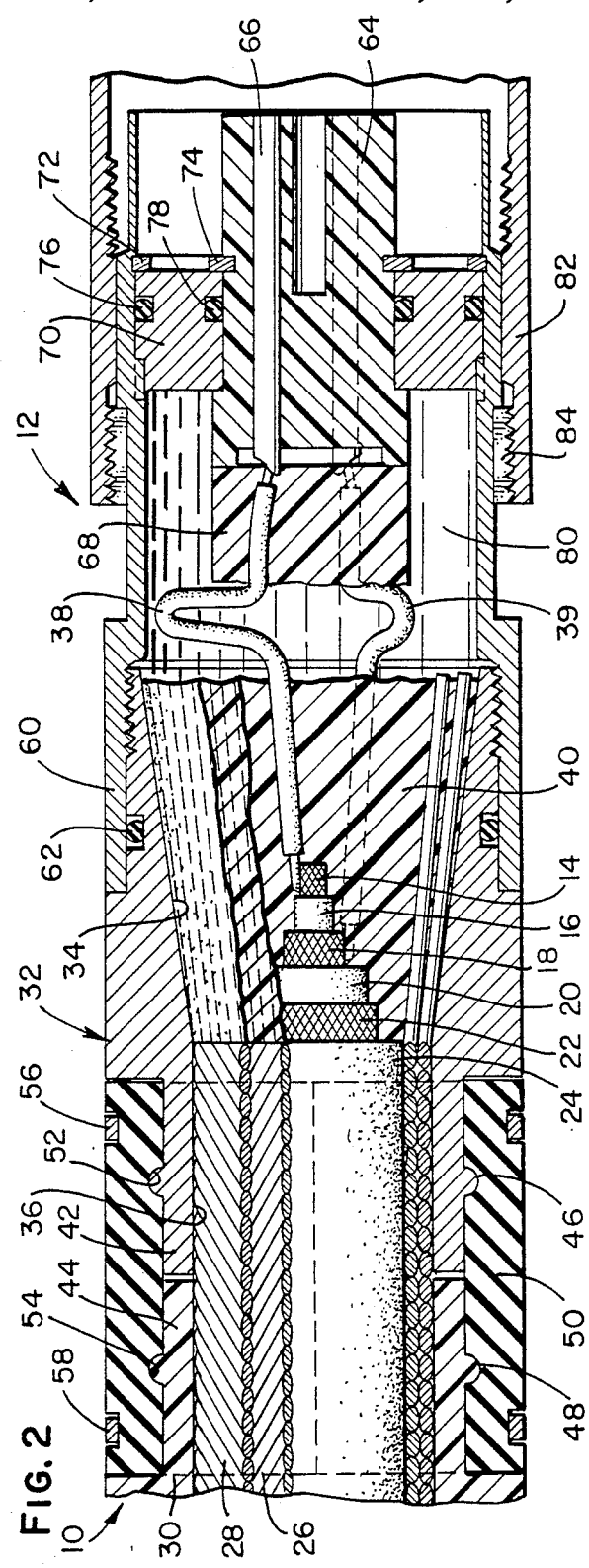
FIG. 2 is an enlarged section taken generally along the line 2—2 of FIG. 1, with parts broken away, showing the internal structure of the termination.

FIG. 1 shows a cable 10 which is terminated in connector 12. As is seen in FIG. 2, cable 10 is electrically a triaxial cable. Center conductor 14 is a stranded conductor of twisted wire. It is covered with insulator 16 which is a continuous flexible dielectric material suitable and conventional for the insulation of electric conductors. Inner shield conductor 18 surrounds insulator 16 and is braided of a plurality of flexible wires. Inner shield 18 is in turn covered by insulator 20, which is of the same type of material as insulator 16. Outer shield 22 is a braided conductor of a plurality of flexible wires surrounding insulator 20. Outer insulator 24 surrounds outer shield 22 and is of the same material as insulator 16. This structure provides a flexible waterproof cable.

To provide tension strength to the cable, outer insulator 24 is covered by inner tension member 26, which, in turn, is covered by outer tension member 28. These tension members are each comprised of a plurality of galvanized plow steel wires. The wires of tension member 26 are wound around outer insulation 24 in a long-pitched spiral, and there are sufficient wires to lie substantially against each other. Outer tension member 28 has its wire in a similar long pitch and lying side-by-side, but in the opposite spiral so that when the cable is subject to tension, there is sufficient torque balance. Cable sheath 30 is formed around the tension members to seal them against water and against physical damage. Cable sheath 30 is of thermoplastic synthetic rubberlike material. Such a cable is capable of carrying electric signals under water and is capable of considerable tensile strength, depending upon the character of the tension members. However, wherever it is used, it must be connected at each end. The upper end connection, out of the water and perhaps out of the tension is not as great a problem. However, the underwater connection must reliably carry both electric signals and tension and thus, requires special character. In addition, it is desirable to have available such cables in less than the maximum length so that several cables can be connected to make up the desired length. The cable must also be connectable to signal source and sensor arrays. Such connections also have the same characteristics of reliably transmitting tension and electric signals.

Connector 12 joins with the cable to provide sealing, tension transference and electrical connection. Connector 12 includes a cup body 32 which has an outer diameter substantially the diameter of sheath 30. Interior conical cup surface 34 is formed in cup body 32, with the larger end to the right. In the preferred embodiment, the conical surface has a total included angle of 10 degrees. The cup body is of metal and can resist annular tension forces. Adjoining the cup surface 34 is cylindrical surface 36 which is large enough to receive the cable from outer tension member 28 inward, after the sheath is stripped therefrom. Both surfaces 34 and 36 are smooth.

Within the cup body 32 conductors 14, 18 and 22 are stripped back, as shown, and the insulators 16, 20 and 24 are stripped back, as shown, to provide stepped surfaces. To provide connection to the cable conductors, at least one hookup wire is connected to each of the conductors 14, 18 and 22. Hookup wires 38 and 39 are illustrated in FIG. 2, respectively connected to conductors 14 and 18. There is another such hookup wire (not shown) connected to outer shield 22. For purposes of redundancy, two hookup wires can be connected to each conductor. The hookup wires extend to the right out of cup body 32.

When the cable end is in place in cup body 32 in the position shown, with the tension member ends in line with the open end of the cup, tension members 26 and 28 are unwound and spread into conical configuration as shown. Thereupon, the cup is filled with an epoxy plug 40 which embraces, encloses, seals and insulates around the exposed conductor ends shown in FIG. 2. The interior surfaces 34 and 36 of cup body 32 are smooth, and it is not intended that there be significant adhesion between the epoxy plug and the cup surface. When cable tension is applied to the left, as seen in FIG. 2 with respect to the cup body, the plug 40 moves to the left and compresses around the tension members 26 and 28 to thoroughly grasp the tension members. The amount of compression is linear with the amount of tension in the cable. Thus, the plug maintains its grasp on the tension members throughout the entire cable tension range and will eventually be strong enough to break the steel armor wires rather than fail at the nose cone.

The left end of cup body 32 is cut down to define a tubular boss 42 integrally formed with the cup body. Similarly, the right end of cable sheath 30 is cut down to form a corresponding tubular boss 44. Each of these bosses carries external half-round annular rings 46 and 48 which are respectively formed on bosses 42 and 44. Flexible sleeve 50 is of rubbery material and is dimensioned to fit upon bosses 42 and 44 and extend substantially to the outer diameter of the sheath and cup body. Flexible sleeve 50 carries corresponding halfround grooves 52 and 54 which respectively receive the rings 46 and 48. In this way, sealing is achieved between cup body 32 and sheath 30 when tension is applied. Tension causes spreading between bosses 42 and 44, but the stretchiness of flexible sleeve 50 maintains sealing. External pressure maintains the sleeve in proper sealing contact. In addition, in order to reassure such sealing at low pressures, clamp rings 56 and 58 are also provided around the flexible sleeve, outboard of the annual rings and grooves. If desired, sealing adhesive may be applied at or adjacent the ends of the sleeve for further sealing assurance.

The cable is thus terminated both as a tension member and as an electrical cable and is sealed with respect to cup body 32. Connector body 60 is threadedly engaged on the right end of the cup body 32 and is sealed with respect thereto by means of 0-ring 62. Female plug body 64 contains sufficient plug recesses to connect the circuits found in cable 10. In the present case, it has three female recesses, or six if redundancy is desired. One such recess 66 contains a socket to which hookup wire 38 is connected. A hookup wire is connected to each such socket. In order to provide strain relief for the connection between the hookup wire and the socket within the recess, potting plug 68 is molded around the area at which the hookup wires are connected to the sockets.

Ring 70 is maintained in place by means of snap rings 72 and 74 and is sealed within body 60 and around body 64 by means of 0-rings 76 and 78. The enclosed space 80 is filled with oil. Thus, the electrical connections are transferred.

Connector collar 82 is threaded onto a split ring 84 which is lodged behind the shoulder on connector body 60. Connector collar 82 is internally threaded to receive a male connector which has pins to engage in the recesses 66 and electrically connected sockets therein and has a body onto which the connector collar 82 is threaded. In this way, tension transfer to an adjacent compatible structure is achieved.

This invention has been described in its presently contemplated best mode, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A cable termination for a cable having at least one electric conductor therein, a tension member in addition to the conductor and a flexible cable sheath around the tension member, comprising:

a cup body, a cylindrical surface within said cup body sized to receive the tension member of the cable when the cable sheath is removed, said cup body having therein a conical cup surface adjoining said cylindrical surface and conically enlarging therefrom toward a coupling end of said body so that the tension member of the cable can be expanded in the conical cup defined by said conical cup surface and a plug can be formed within the expanded tension member, said cylindrical surface and said conical cup surface being smooth so that the tension member and plug can slide therein to compress in said cup; and a flexible sleeve connected to and sealed with respect to said cup body and for connection and sealing with respect to the cable sheath so that as the cable moves with respect to said cup body, said flexible sheath stretches to maintain sealing between said cup body and the cable sheath.

2. The termination of claim 1 further including a connector body secured to said cup body, said connector body being a portion of connection means for electrically connecting and tension force connecting said termination for signal connection and for tension connection.

3. The termination of claim 1 wherein said cup body has an outer diameter substantially equal to the diameter of the cable sheath, said cup body having a tubular boss of reduced outer diameter, said flexible sleeve being engaged upon said tubular boss, said flexible sleeve having an outer surface of substantially the same diameter as said cup body.

4. The termination of claim 3 wherein said tubular boss has a sealing surface thereon and said flexible sleeve has a corresponding sealing surface thereon so as to enhance sealing between said boss and said flexible sleeve.

5. The termination of claim 4 wherein a clamp ring is clamped around said flexible sleeve where said flexible sleeve embraces said tubular boss to enhance sealing of said flexible sleeve on said tubular boss.

6. The termination of claim 5 further including a connector body secured to said cup body, said connector body being a portion of connection means for electrically connecting and tension force connecting said termination for signal connection and for tension connection.

7. The termination of claim 1 wherein the tension member is tubular and surrounds said conductor so that said conductor passes through said plug.

8. The termination of claim 7 further including a connector body secured to said cup body, said connector body being a portion of connection means for electrically connecting and tension force connecting said termination for signal connection and for tension connection.

9. An electric cable tension termination in combination with an electric cable;

said cable comprising at least one flexible electrical conductor, insulation around said conductor, a flexible tension member around said insulation and a cable sheath around said tension member to define a flexible cable of substantially uniform and substantially circular cross section;

said termination including a cup body, said cup body being metallic and having a circular cylindrical interior surface of sufficient diameter to receive said tension member, said cup body having a connection end away from said cylindrical surface, a conical cup surface within said cup body, said cup surface adjoining said cylindrical surface and being divergent toward said cup end and extending to said cup end, said cable sheath being stripped back from the end of said cable and lying substantially against said cup body while said tension member lies within said cup body and extends substantially to its connection end, said tension member being spread within said cup body defined by said conical cup surface and being filled with plug material substantially to said connection end, said cylindrical surface and said conical surface within said cup body being substantially smooth so that tension on said connection end of said cup body causes sliding of said cup body to cause compression of said plug to inhibit pulling said cup body off of said cable.

10. The termination of claim 9 further including:
a connector body attached to said cup body, said connector body carrying an electrical connector therein, said electrical connector being electrically connected to said conductor in said cable; and
a connector collar on said connector body, so that said connector collar can be disconnectably attached to a corresponding connector for electric and tension termination.

11. The combination of claim 9 wherein said cup body includes a tubular boss thereon of reduced diameter directed toward said sheath; and said sheath includes a boss of reduced diameter extending toward said cup body; and further including
a flexible, resilient sleeve engaging both of said bosses so that when said plug slides with respect to said cup body, said flexible sleeve maintains closure between said cup body and said cable sheath.

12. The termination of claim 11 further including:
a clamp ring around said flexible sleeve to clamp said flexible sleeve against said boss on said cup body; and
a clamp ring around said flexible sleeve to clamp said flexible sleeve onto said boss on said cable sheath.

13. The termination of claim 11 wherein there is a seal member on each of said bosses and a corresponding seal member within said flexible sleeve to aid in sealing between said sleeve and said bosses.

14. The termination of claim 13 further including:
a clamp ring around said flexible sleeve to clamp said flexible sleeve against said boss on said cup body; and
a clamp ring around said flexible sleeve to clamp said flexible sleeve onto said boss on said cable sheath.

15. The termination of claim 14 further including
a connector body attached to said cup body, said connector body carrying an electrical connector therein, said electrical connector being electrically connected to said conductor in said cable; and
a connector collar on said connector body, so that said connector collar can be disconnectably attached to a corresponding connector for electric and tension termination.

16. The termination of claim 9 wherein said cable comprises at least two electrical conductors electrically isolated from each other and further includes inner and outer tension members, each of said inner and outer tension members comprising a plurality of wire strands, said wire strands of said inner tension member being helically twisted along the length of said cable upon the insulation of said conductors and said wire strands of said outer tension member being helically twisted around said inner tension member in the opposite helix, both said inner and outer tension members being spread and being filled with a plug so that upon tension in said tension members, said plug slides within its conical cup and said plug is compressed around both said inner and outer tension members.

17. The combination of claim 16 wherein said cup body includes a tubular boss thereon of reduced diameter directed toward said sheath; and
said sheath includes a boss of reduced diameter extending toward said cup body; and further including
a flexible, resilient sleeve engaging both of said bosses so that when said plug slides with respect to said cup body, said flexible sleeve maintains closure between said cup body and said cable sheath.

18. The termination of claim 17 further including:
a connector body attached to said cup body, said connector body carrying an electrical connector therein, said electrical connector being electrically connected to said conductor in said cable; and
a connector collar on said connector body, so that said connector collar can be disconnectably attached to a corresponding connector for electric and tension termination.

* * * * *